United States Patent Office 3,522,916
Patented Aug. 4, 1970

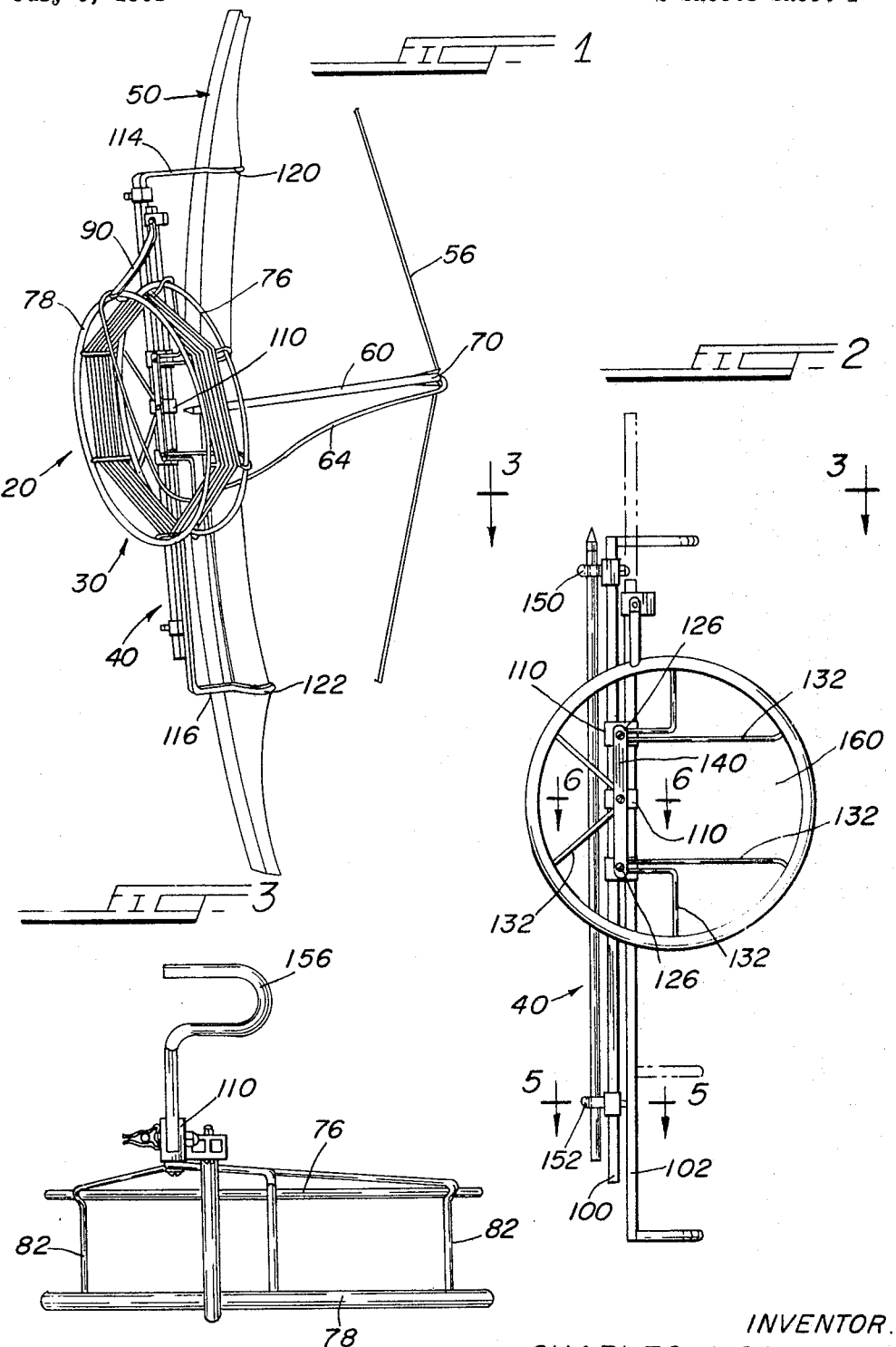

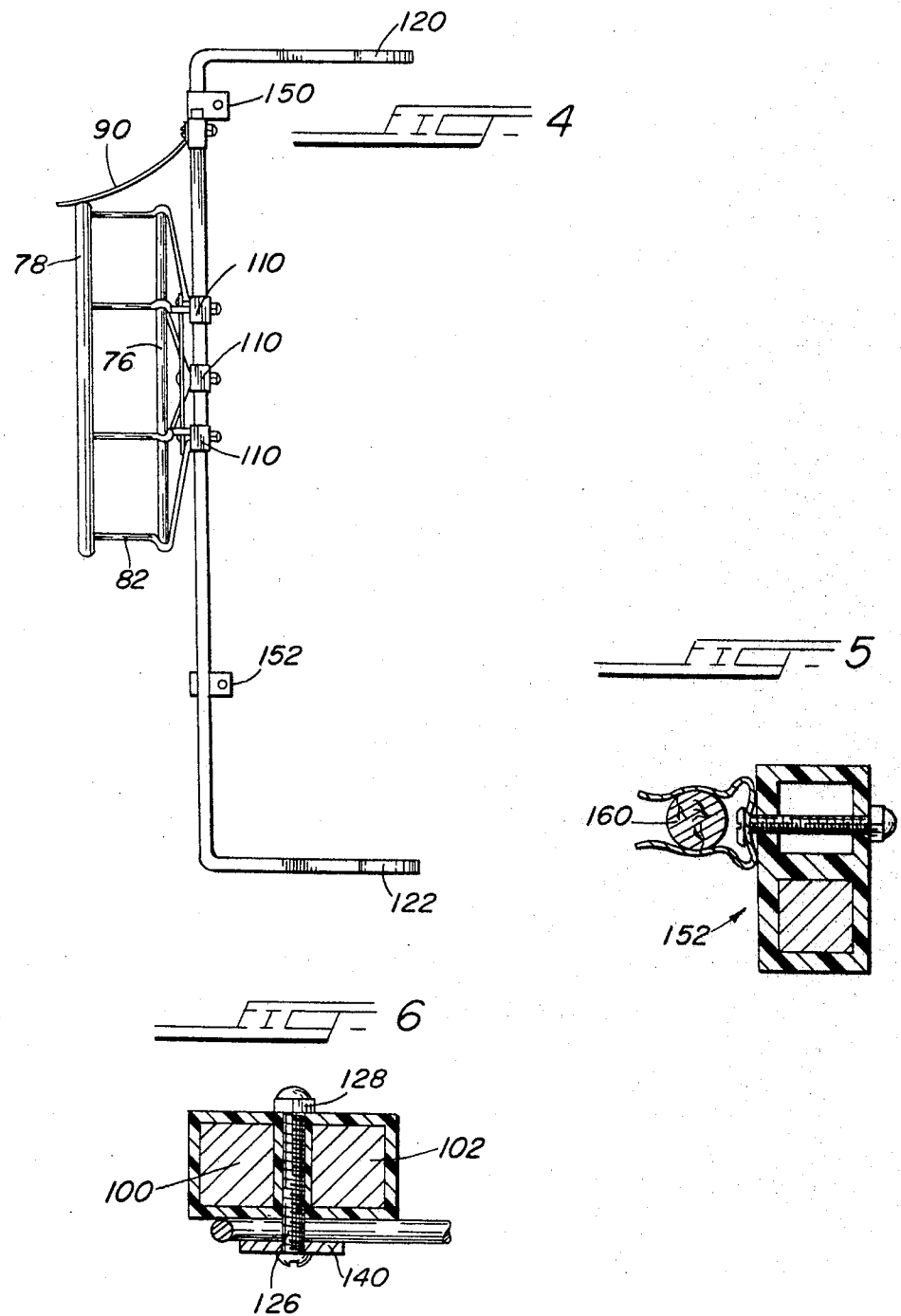

3,522,916
ARCHERY REEL WITH LINE-RESTRAINING
MEANS
Charles A. Saunders, Box 102, Columbus, Nebr. 68601
Filed July 5, 1968, Ser. No. 742,712
Int. Cl. A01k 89/00; F41b 5/00
U.S. Cl. 242—99                                              9 Claims

ABSTRACT OF THE DISCLOSURE

A light-weight, skeletal reel assembly attachable to an archery bow and including automatically operable means for controlling the release or rewinding of the reel-carried line.

---

The present invention relates to an improved reel for archery bows. More particularly, the invention is directed to a reel assembly attachable to a conventional bow. A retrievable hunting or fishing arrow is attached to the bow-carried reel through a connecting reel-wound line.

The prior art is replete with various types of bow and arrow fishing devices, archery bow reels, and bow and arrow fishing tackle. This type of sporting equipment has attracted considerable attention and has been the subject of extensive research and experimentation as a result of which many and varied types of apparatus have been described and illustrated. Notwithstanding the extensive work that has been done in this field, each of the prior art assemblies has objectionable features which have deterred general acceptance and which have dictated against widespread use. Some of the mechanisms have been unduly cumbersome, interfering with the effective use of the bow and arrow. In other assemblies there has been impairment of sighting or viewing due to either the physical configuration or the placing of the bow-carried reel. In still other adaptations of available equipment, release of the arrow from the bow initiates a substantially uncontrolled unwinding of the line from the reel, the momentum established being effective to cause unwinding which continues even after forward motion of the arrow ceases. In yet other archery bow and reel assemblies the reel has been fastened to the bow only with difficulty and has often rendered the bow unsightly or has impaired the bow for later use in more common archery pursuits.

From the foregoing illustrative examples of typical problems inherent in prior art structures, it will be appreciated that a completely satisfactory bow and arrow fishing tackle assembly or hunting assembly which includes a retrievable line-connected arrow and a bow-mounted reel has been, heretofore, unknown. It is, therefore, the aim of the present invention to obviate many of the structural deficiencies of prior art assemblies and to eliminate prior art shortcomings and problems through the use of an improved bow-mounted reel for archery use.

It is a principal object of the invention to provide a bow mounted reel which is light in weight and which may readily and conveniently be attached to a conventional archery bow in a manner such that the reel does not impair viewing or sighting during archery use.

A further object of the invention is to provide a reel for an archery bow, which reel includes a simple yet highly effective means through which payout or unwinding of the arrow-attached line automatically terminates when forward motion of the arrow stops.

Another object of the invention is to provide, in a bow-carried archery reel, means which effectively restrain and retain the reel-wound line on the reel until the arrow is released and which will then automatically permit substantially unimpeded payout of unwinding of the line as the arrow travels forwardly.

A related object of the invention is to provide a reel for archery bows and which includes a line-discharge restraining element which is readily repositionable to a stand-by disposition thereby permitted unobstructed rapid rewinding of the line on the reel.

A further object of the invention is to provide a reel assembly which includes adjustable bow-mounting means facilitating the attachment of the reel to any conventional bow, without the use of bow-marring or damaging structures such as screws and bolts.

Still another object of the invention is to provide a bow reel in which the unwinding of the line is controlled to obviate fouling when the arrow is shot from the bow.

Other and further objects, features, and advantages of the invention will become apparent from the following specification taken in conjunction with the drawings in which:

FIG. 1 is a perspective view of a fragmentary portion of a conventional bow and showing the bow-mounted reel of the invention and its mode of attachment to the bow;

FIG. 2 is a front view of the archery reel of the invention;

FIG. 3 is a top plan view of the assembly shown in FIG. 2;

FIG. 4 is a side elevational view of the archery reel of the invention, including the bow attachment brackets;

FIG. 5 is a cross-sectional view taken substantially on the line 6—6 of FIG. 2 and illustrating the manner of attachment of an arrow-retaining clamp on the bow-mounted reel assembly; and FIG. 6 is a cross-sectional view taken substantially on the line 6—6 of FIG. 2.

The objects of the invention are achieved and the advantages are realized by providing in an archery reel assembly a lightweight skeletal reel, means for securing the reel to a conventional bow, and automatic means for controlling and restraining the unwinding of the reel-wound line upon release of the arrow.

Referring now to the drawings, and particularly to FIGS. 1 through 4, the reel assembly 20 is shown, for purposes of disclosure, as embodying, in a preferred embodiment, a reel 30 secured to an adjustable bow-gripping, reel-mounting bracket assembly 40, the latter being in turn attached to a conventional bow 50. For orientation purposes and to facilitate a complete understanding of the invention, the fragmentary illustration of FIG. 1 includes a bow string 56 with an arrow 60 nocked thereon. A reel-wound line 64 is shown as attached at one end 66 to the arrow 60 near the fletching 70.

The reel 30 itself is of a skeletal, open, light-weight construction and includes spaced rearward and forward rings 76 and 78 disposed to encircle a common axis and interconnected through a plurality of annularly spaced rod-like bars 82 secured to and extending transversely of and between the rings. In the form of the invention illustrated, the rods 82 are displaced somewhat radially inwardly of the periphery of the rings 76 and 78 so that the rods, in conjunction with the rings, define a channel-like lattice upon which the line 64 is conveniently wound. The reel 30 has a rather large diameter, this feature ensuring clear and unobstructed sighting and aiming during use of the assembly. The reel itself is secured to the bow-gripping reel-mounting assembly 40 in a manner which is hereinafter described.

A very important feature of the reel assembly of the invention is a novel control means which not only holds the line in place preparatory to or prior to shooting, but also regulates and controls unwinding or payout when the arrow is shot or released from the bow. The line control means is described with reference to FIGS. 1, 3 and 4. Referring now to FIGS. 1 and 4, a spring finger or spring band 90, preferably fabricated of spring steel and coated with a line-protecting elastomer, is fastened at one end 92 to the reel-mounting assembly 40 and stressingly engages at its other end 94 and overlies the outer ring or forward ring 78 of the reel 30. It will be appreciated from a consideration of the structure and arrangement illustrated in FIG. 1 that as the arrow 60 leaves the bow 50, the attached line 64 unwinds or unreels and with each line turn removed from the reel, the line 64 must pass between the spring finger 90 and the forward ring 78. In effect, the spring finger 90 forms in combination with the forward ring 78 of the reel a restricted gate-like automatically-opening, line-restraining passage. The restriction creates a controlled but extremely light frictional drag on the line, the drag being overcome and the gate-like passage opening readily through forces correlated with and existing during forward movement of the arrow. However, with the cessation of forward motion of the arrow, the force of engagement of the resilient finger 90 against the ring 78 is adequate to preclude further line passage and further release and unwinding of the line. Payout of the line is effectively controlled and regulated and objectionable snagging is obviated. The spring finger 90 is pivotally secured 98 to the reel mounting assembly 40 so that the finger 90 may be shifted to a position out of engagement with the ring 78 to facilitate retrieval and rewinding of the line 64 on the reel 30.

The reel 30 of the invention may be attached to the bow 50 using any preferred technique. In the specific embodiment of the invention illustrated the bracket assembly 40 which carries the reel 30 includes a pair of at least partially coextensive, parallelly held and axially slidably disposed rods or bars 100 and 102 slidably passing through combination guides and clamps 110. One end of each rod 100 and 102 is bent or otherwise deformed to define a rearwardly and transversely extending leg 114 and 116 terminating in an integral laterally opening generally U-shaped clamp 120 and 122 so that one clamp is at each end of the slidably extensible rod assembly. Securement of the rods or bars 100 and 102 in any desired extended or retracted position is achieved by means of bolts 126 and cooperating nuts 128, the bolts passing through the slide guides 110 whereby tightening of the nut and bolt assemblies brings opposed walls of the slide guides 110 into firm abutment against the rods 100 and 102 and precludes relative movement.

The reel 30 includes a supporting lattice or open frame of rigid wires 132 which, in the preferred form of the invention illustrated are extensions of the wires or rods 82 which interconnect and hold in their relative positions the rearward 76 and forward 78 rings of the reel in their relative positions. As seen most clearly in FIG. 2, the wires 132 are looped about the slide bar clamping bolts 126, and an overlying bolt-held plate 140 secures the looped portions to the slide guides to support the frame forwardly of the bow, leaving an unobstructed viewing and aiming window 160. An important feature of the structure described is that, the clamping assembly may be rapidly and simply adjusted and the bow-engaging clamps 120 and 122 properly spaced to accommodate any conventional bow. In practicing the invention, the reel is fastened to the bow at its rigid and substantially inflexible mid-section so as to eliminate vibration of the reel assembly during shooting. An additional feature of the bracket 40 is that it carries a pair of arrow shaft clamps 150 and 152 for convenient retention of the fiishing arrow 60.

Light weight metal alloys such as alloys of aluminum and of magnesium are preferred structural materials for the reel 30 and for the bow clamping bracket assembly 40. The metal structures of the reel assembly are preferably anodized or otherwise treated to impart corrosion resisting qualities. In addition, the bow clamping members 120 and 122 are preferably coated with an elastomeric material or relatively soft resilient coating 156 to enhance the gripping action of these clamps on the bow and to obviate any damage to the bow itself. Plastisol compositions of the type well known in the art have been found to be particularly suitable. These coatings may be applied in any preferred technique such as by dipping.

While this invention has been described with reference to preferred embodiments and structural materials, it is evident that the invention is not limited thereto. To the extent that changes and modifications which may be made are within the scope of the appended claims, they are to be considered a part of this invention.

What is claimed is:

1. In an archery reel adapted for attachment to a bow and including a reel-wound, reel-anchored line adapted for attachment to an arrow to be discharged from said bow, and including means for attachment of said reel to a bow, line control means automatically releasably restraining and regulating payout of said line during arrow flight and precluding objectionable continued release and discharge of line from said reel when forward motion of said arrow ceases, said reel being provided with a forward ring,
said line control means comprising,
spring finger means resiliently biased stressingly to engage and bear lightly upon said forward of said reel, and
attachment means securing said spring finger means to said reel assembly,
said spring finger means defining in combination with said forward ring of said reel a restricted, gate-like, line-restraining passage through which each turn of the reel-wound line must pass as said line is discharged from said reel,
said passage creating a controlled frictional drag on said line during propelled travel of said line therethrough,
said drag being overcome and said gate-like passage opening through forces correlated with and existing only during forward motion of said arrow, and obviating undesirable continued unwinding of said line when advance of said arrow stops.

2. The structure as set forth in claim 1 wherein said attachment means securing said spring finger means to said reel assembly includes clamping means frictionally retaining said spring finger means in selectable pivotal dispositions to permit shifting of said spring finger means between a ring-engaging position correlated with discharge of the line-carrying arrow and a retracted, ring-disengaged position permitting unobstructed rewinding of said line on said reel.

3. The structure as set forth in claim 1 wherein said spring finger means consists essentially of a flexible, resilient, blade-like band presenting a principal face in tensioned and stressed abutment against a cooperating surface of said forward ring.

4. The structure as set forth in claim 3 and further comprising means for pivotally shifting said band from abutment with said forward ring to a position displaced therefrom, to provide unobstructed access to said reel for rewinding of said line thereon.

5. The reel assembly as set forth in claim 1 wherein said means for attachment of said reel to a bow comprises spaced upper and lower bow-clamping brackets connected to said reel and adapted to engage and clamp upon upper and lower limbs of said bow;

each said clamping brackets defining an open-ended bow limb receiving and retaining slot.

6. The reel assembly of claim 5 and further comprising slide means for selectively adjusting longitudinal spacing between said upper and lower bow-clamping brackets.

7. The reel assembly of claim 5 wherein said clamping brackets comprise corrosion-resistant light-weight metal alloys.

8. The reel assembly of claim 7 and further comprising a resilient plastic coating covering said metal alloys at areas for engaging and gripping said bow to enhance attachment to and gripping of a bow and to obviate damage thereto.

9. In an archery bow reel assembly of the character described and including a skeletal reel and means for attachment of said reel to a bow, said reel comprising spaced rear and forward rings interconnected through rods secured to and extending transversely of and between said rings adjacent peripheries thereof, said reel adapted to carry an arrow-retrieving line wound thereupon, whereby said line is paid out upon discharge of an arrow through said rings;

the improvement which comprises:

line control means automatically releasably restraining and regulating payout of said line during arrow flight and precluding objectionable continued release and discharge of line from said reel when forward motion of said arrow ceases, said line control means comprising, spring finger means resiliently biased stressingly to engage and bear lightly upon said forward ring of said reel, and attachment means securing said spring finger means to said reel assembly, said spring finger means defining in combination with said forward ring of said reel a restricted, gate-like, line-restraining passage through which each turn of the reel-wound line must pass as said line is discharged from said reel, said passage creating a controlled frictional drag on said line during propelled travel of said line therethrough, said drag being overcome and said gate-like passage opening through forces correlated with and existing only during forward motion of said arrow, and obviating undesirable continued unwinding of said line when advance of said arrow stops.

References Cited

UNITED STATES PATENTS

| | | | |
|---|---|---|---|
| 2,462,958 | 3/1949 | Hanson | 242—99 |
| 2,706,096 | 4/1955 | Rufle | 242—99 |

GEORGE J. MARLO, Primary Examiner

W. R. BROWNE, Assistant Examiner

U.S. Cl. X.R.

124—23; 242—84.2

UNITED STATES PATENT OFFICE
CERTIFICATE OF CORRECTION

Patent No. 3,522,916                        August 4, 1970

Charles A. Saunders

It is certified that error appears in the above identified patent and that said Letters Patent are hereby corrected as shown below:

Column 4, line 23, after "forward" insert -- ring --.

Signed and sealed this 2nd day of March 1971.

(SEAL)
Attest:

Edward M. Fletcher, Jr.
Attesting Officer

WILLIAM E. SCHUYLER, JR.
Commissioner of Patents